2,960,387
Patented Nov. 15, 1960

2,960,387

REMOVAL OF CHROMIUM FROM TITANIUM DIOXIDE PRODUCT

Eugene Wainer, Cleveland Heights, Ohio, assignor to Horizons Incorporated, Cleveland, Ohio, a corporation of New Jersey No Drawing. Filed Mar. 14, 1958, Ser. No. 721,349

4 Claims. (Cl. 23—202)

This invention relates to a process for the removal of impurities from ilmenite ores and heavy grade rutiles in order to produce a rutile useful in industrial processes for which stringent specifications for this material must be met. More particularly, it relates to the process for beneficiating titaniferous minerals to recover relatively pure titanium dioxide as rutile.

In a co-pending application, Serial No. 590,101, filed June 8, 1956 and which issued as U.S. Patent 2,914,381 on November 24, 1959 I have described a procedure whereby ilmenite ores containing at least 5% of the iron content present as ferrous iron may be beneficiated to obtain a product substantially free from silica and pyrites. The treatment therein described consists of digestion of the crushed ore with a concentrated aqueous solution of hydrochloric acid at a temperature slightly below the boiling point of the solution, separation of the treated mineral into a fraction coarser than 325 mesh and into a fraction finer than 325 mesh, and drying of the finer fraction and recovery of the resulting titanium dioxide product. I have now found a means for further beneficiation to remove compounds of the metal chromium.

Chromium compounds in very small amounts produce distinct colorations in titanium dioxide. For example, chromium nitrate generally imparts a light gray-tan color, chromium alum a buff-color and potassium dichromate a dark buff color to titanium dioxide pigments. The presence of minute amounts of chromium compounds in amounts corresponding to amounts of $Cr_2O_3$ greater than 0.0015% will deleteriously affect the light reflectance properties of titanium dioxide porcelain enamels.

I have now found a relatively direct procedure for diminishing the chromium impurity to levels below those at which it imparts a color to the rutile product of my earlier process. The invention which will be described is operative upon the uncalcined hydrated rutile which is directly formed by the operation of my earlier beneficiation procedure or upon the calcined rutile product of that procedure.

The process by which the chromium content is diminished to the desired extent consists of the leaching of the hydrated rutile produced by my earlier process in a caustic leach into which a small percentage of a peroxide has been introduced or if the hydrated rutile has been calcined then the present invention involves leaching of the calcined product by a caustic leach containing a small percentage of peroxide.

In the practice of my earlier invention, the titaniferous ore is first crushed and material finer than 65 mesh (Tyler Standard) is separated from the coarser material. The coarser residue is then digested in HCl and filtered to separate all of the solids from the liquid phase. The liquid is principally an acid solution of ferrous and ferric chlorides. When the solid filter cake is washed free of soluble iron compounds and is separated into two fractions, the one coarser than 325 mesh has been found to contain essentially all of the silica and pyrites and the fraction finer than 325 mesh consists of hydrated titanium dioxide and some of the other impurities. This procedure separates the silica, pyrites, aluminates and alkaline earth materials present in the ore from the titania in the ore, but does not appreciably separate the chromium from the titania.

The chromium impurity can be separated from the titania in the filter cake by treating the solids immediately after filtration and prior to the mechanical separation; or by treating the hydrated rutile product obtained after drying the solids; or by treating the calcined rutile product, resulting from calcination of the dried hydrated rutile.

In the procedure which has been found to be effective in removing chromium from these materials, the solids are leached in caustic solution preferably containing small concentrations of a peroxide, with agitation and at temperatures of 85–95° C. It appears that by the action of the caustic, chromium oxide is readily solubilized as a chromate, particularly in the presence of the peroxide. Preferably the peroxide is an alkali metal peroxide such as sodium peroxide ($Na_2O_2$) in which case an alkali chromate is formed. The progressive solubilization and removal of chromium from the rutile can be followed by periodic analysis of the caustic or caustic-peroxide solution. In a maximum of six hours of digestion the removal of chromium is essentially completed. The rutile product is filtered, washed and mechanically separated if necessary. Usually, the product is calcined to yield fired rutile.

The products which now contain less than 0.0015% $Cr_2O_3$ and are essentially free also of pyrites, silica, aluminates and alkaline earth compounds by virtue of the earlier treatment with HCl are useful in processes in which heavy grade rutiles are required, for example, in the preparation of white or colored porcelain enamels.

The following examples will serve further to demonstrate the novel aspects of my invention but are intended to be illustrative rather than limitative of my process.

*Example I*

A sample of Ivry-Nord ilmenite containing approximately 0.05% of chromium (expressed as oxide) was crushed. Particles coarser than 10 mesh (Tyler Standard) were returned for further comminution. Particles finer than 65 mesh (Tyler Standard) were discarded. The material finer than 10 mesh and coarser than 65 mesh was digested with concentrated HCl at a temperature between 85° C. and 95° C. for about 36 hours.

One portion of the hydrated rutile still retaining the gangue constituents remaining as gross particles following treatment with the concentrated aqueous solution of hydrochloric acid was filtered and washed free of soluble iron compounds and of hydrochloric acid. Five hundred (500) grams of the wet filter cake were digested in 1200 ml. of a solution of 2% NaOH at temperatures of 83–94° C. for 48 hours with moderate agitation. After digestion, the slurry was allowed to settle and cool. The supernatant yellow liquor was decanted and the solids filtered and washed free of sodium ion with water. The solids were then screened through a 325 mesh (Tyler Standard) screen. The minus 325 mesh portion was calcined at 800° C. for one hour and the product was found to contain an insufficient amount of chromium to disqualify it from use in the preparation of porcelain enamels required to have excellent light reflectance, indicative of a chromium content of below 0.0015%.

Another portion of the hydrated rutile obtained by the treatment of the crushed ore with concentrated HCl was washed free of soluble iron compounds and of hydrochloric acid as before and screened through a 325 mesh screen. The minus 325 mesh fraction was dried and calcined for one hour at 800° C. The product was analyzed and found to contain about 0.05% chromium, that originally present in the ore.

*Example II*

Hydrated rutrile, prepared as in Example I was treated in the same manner as in Example I, with the exception that the 2% NaOH leach solution also contained 1% $Na_2O_2$. The treatment was effected at between 90° C. and 95° C. for 24 to 48 hours. Again the leach liquor tested positively for chromium. The rutile product after calcination contained less than about 0.0015% chromium (expressed as $Cr_2O_3$). Apparently the peroxide facilitated the oxidation and dissolution of the chromium compounds present.

I claim:

1. A process for upgrading impure titanium dioxide by removing compounds of chromium therefrom, which comprises: subjecting the solids produced after HCl digestion of the impure material to treatment with a dilute aqueous solution of caustic soda and alkali metal peroxide at about 80° to 95° C. for a time sufficient to dissolve the compounds of chromium and to thereby diminish the chromium content of the remaining solids to below an amount detrimental to their use in the manufacture of porcelain enamels.

2. The process of claim 1 in which the solution of caustic is a 2% solution of NaOH in $H_2O$ and containing about 1% $Na_2O_2$.

3. The process of claim 1 in which the solids treated are calcined before treatment with the solution of caustic soda.

4. The process of claim 1 in which the remaining solids are calcined to produce a low-chromium fired rutile.

References Cited in the file of this patent

UNITED STATES PATENTS

| | | |
|---|---|---|
| 1,206,797 | Barton | Dec. 5, 1916 |
| 1,845,633 | Specht | Feb. 16, 1932 |
| 2,357,988 | Van Wirt | Sept. 12, 1944 |
| 2,842,428 | Tanner et al. | July 8, 1958 |
| 2,875,107 | Daiger | Feb. 24, 1959 |

FOREIGN PATENTS

| | | |
|---|---|---|
| 537,000 | Canada | Feb. 12, 1957 |

OTHER REFERENCES

Barksdale: "Titanium," The Ronald Press Co., 1949, page 33.